Jan. 22, 1963  H. E. McGOWEN, JR  3,074,485
LATCH FOR RETRIEVABLE VALVES OR THE LIKE
Filed Jan. 16, 1959  5 Sheets-Sheet 1

HAROLD E. McGOWEN JR.
INVENTOR.

BY Herbert J. Brown
ATTORNEY

Jan. 22, 1963    H. E. McGOWEN, JR    3,074,485
LATCH FOR RETRIEVABLE VALVES OR THE LIKE
Filed Jan. 16, 1959    5 Sheets-Sheet 2

HAROLD E. McGOWEN JR.
INVENTOR.

BY *Herbert J. Brown*
ATTORNEY

Jan. 22, 1963          H. E. McGOWEN, JR          3,074,485
LATCH FOR RETRIEVABLE VALVES OR THE LIKE
Filed Jan. 16, 1959                    5 Sheets-Sheet 3

HAROLD E. McGOWEN JR.
INVENTOR.

BY *Herbert J. Brown*
ATTORNEY

Jan. 22, 1963 H. E. McGOWEN, JR 3,074,485
LATCH FOR RETRIEVABLE VALVES OR THE LIKE
Filed Jan. 16, 1959 5 Sheets-Sheet 4

INVENTOR.
Harold E. McGowen, Jr.
BY Herbert J. Brown
ATTORNEY

INVENTOR.
Harold E. McGowen, Jr.
BY
ATTORNEY

United States Patent Office 3,074,485
Patented Jan. 22, 1963

1

3,074,485
LATCH FOR RETRIEVABLE VALVES OR THE LIKE
Harold E. McGowen, Jr., Houston, Tex., assignor to Sid W. Richardson, Inc., Fort Worth, Tex., a corporation of Texas
Filed Jan. 16, 1959, Ser. No. 787,238
47 Claims. (Cl. 166—217)

This invention relates to locking devices primarily for oil field equipment though applicable in other relations, and has reference to a latch assembly adapted to be lowered into and raised from a pipe or tubing having an internally projecting shoulder therein, and which latching assembly includes a body and a movable ring thereon adapted to yieldingly pass the referred to shoulder on movement of the assembly through the pipe or tubing in one direction and to subsequently move the ring laterally after passing the shoulder so as to prevent reverse movement of the assembly.

This application is a continuation-in-part of my earlier applications Serial No. 431,211, filed May 20, 1954, Serial No. 543,679, filed October 31, 1955, both now abandoned, and Serial No. 622,216, filed November 14, 1956. In addition to locking flow control devices, such as gas lift valves, chokes or valve dummies as set forth in the referred to application, the present invention is capable of additional uses, for example, it may be used for locking wire line wipers, mandrel packers and strings of tubing in landing nipples or other tubular receivers. Upon consideration of the exemplary forms of the invention herein shown and described, it will become apparent that the use of the invention is not limited to oil field equipment but may be adapted for use in other arts. It will also become apparent that the tubular receiver need not be vertically positioned when in operation, and that the receiver could be horizontal or portable depending on the use of the locking assembly.

An object of the invention is to provide an unusually rugged locking assembly for the described purposes, and one which is not subject to mechanical failure as in conventional constructions having expansible locking means.

A particular object of the invention is to provide a locking assembly for use in pipe in which sand or cement accumulates, and which locking assembly will not become clogged or inoperative due to the presence of such sand or cement.

A further particular object of the invention is to provide a new improved means for locking and supporting tubing within well casing.

These and other objects will become apparent from the following description and the accompanying drawings, wherein:

FIGURE 17 is a vertical sectional view of a length of well tubing including a special section or offset mandrel for receiving a gas lift valve or the like, together with a knuckle joint and jar for installing and removing such valves, and showing a further modification wherein a spring is employed to urge the locking ring against its seat.

FIGURE 18 is an enlarged broken transverse sectional view taken on line 18—18 of FIGURE 17;

FIGURE 19 is a broken sectional view of the latch embodying the features of this embodiment of the invention, and showing the locking arrangement in its offset position in a broken section of an offset mandrel prior to engagement with the locking shoulder forming a part of the latter.

FIGURE 20 is a view similar to FIGURE 19, showing the latch in its locked position.

FIGURE 21 is a broken elevational and sectional view of the latch assembly secured to the upper end of a valve, blank or the like;

FIGURE 22 is a broken sectional view similar to FIGURE 21 showing an elevation of an entire gas lift valve, together with a pulling tool for removing said valve or the like.

Figures 17, 18, 19, 20, 21, 22:
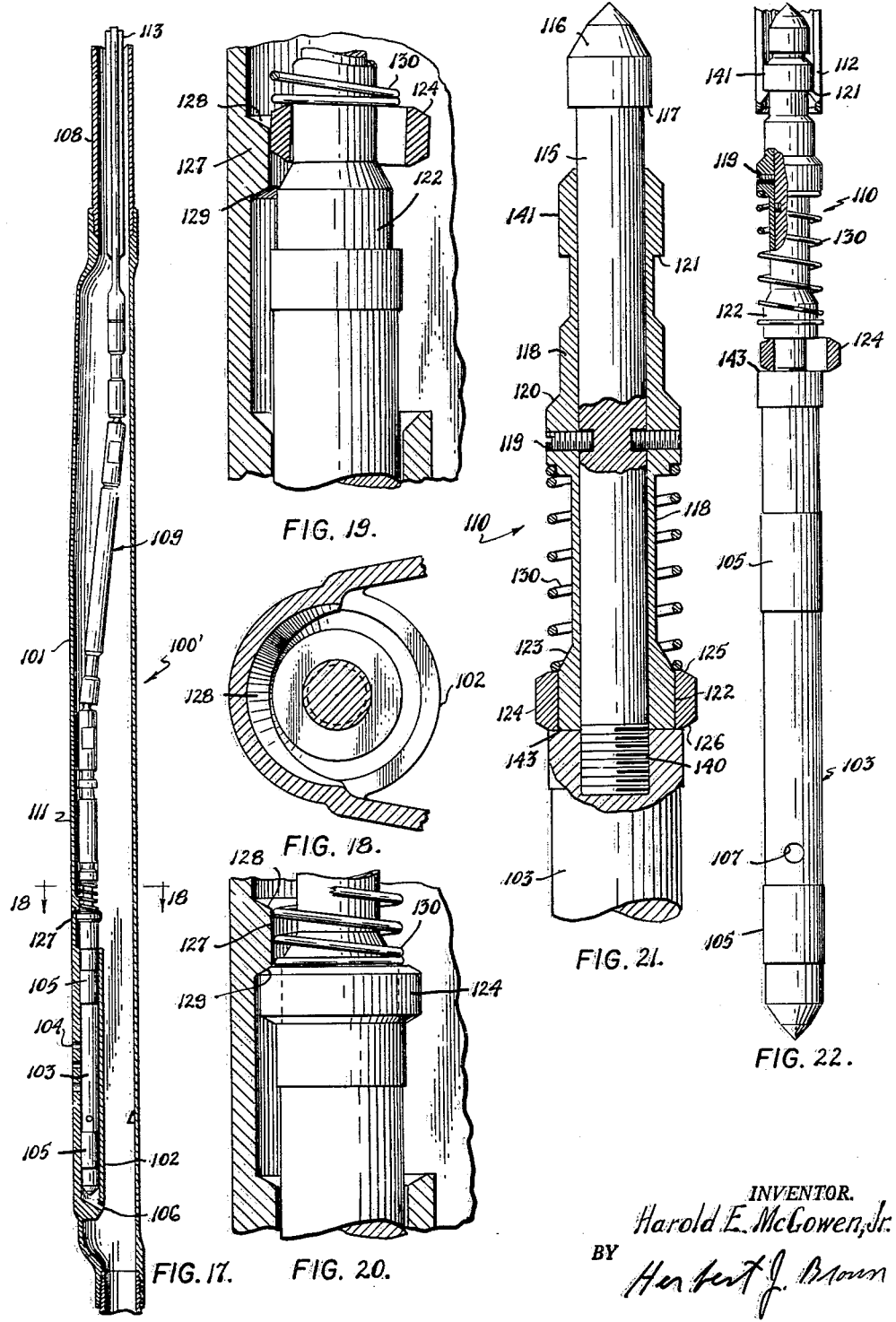

The form of the invention shown in FIGURES 1 through 6 includes a landing nipple 20 threadedly secured within or on the lower end of a string or tubing 21, and which nipple includes integral upper and lower internal annular shoulder or stop members 22 and 23 providing an annular groove 24 therebetween. The inside diameter of the upper shoulder member 22 is larger than the inside diameter of the lower shoulder member 23 and the inside diameter of the latter extends downwardly the full length of said landing nipple and engages and supports a shoulder flange 25 around the upper end of a cylindrical body 26. The body 26 may be a housing for a gas lift valve, not shown, or the same may be provided with means 26a to seal the annular space between body 26 and landing nipple 20 whereby a means is provided for supporting a choke, or control device, or other removable device for operation in a landing nipple. In the present illustration the body 26 includes an axial opening 27 therethrough for communication between the tubing 21 and the lower portion of the well. If desired, the tubular body 26 may extend to or near the bottom of the well and thereby extend the length of the well tubing 21. A tubular mandrel or stem 28 of reduced diameter as compared with the body portion 26 is threadedly secured in the upper end of the body 26 and extends thereabove. The upper end of the mandrel 28 is provided with a cylindrical retaining nut 29 providing an enlarged head adapted to be received in the lower end of a running tool 30. It is to be understood that the running tool 30 is raised and lowered through the string of tubing by means of a flexible line, not shown, and may include conventional apparatus, such as a sinker bar and jars for carrying out its operation as set forth in my application Serial No. 431,211, filed May 29, 1954, now abandoned in favor of the present application, and as shown in FIGURE 17 of the drawings of the present application. A groove 31 around the cylindrical surface of the retaining nut 29 receives portions of upper shear pins 32 transversely positioned through the running tool 30. A locking or restraining sleeve 33 is mounted for sliding action on the mandrel 28, and which sleeve is provided with a neck flange 34 at its upper end, and which flange is close to or in contact with the lower end of the running tool 30 when the latter is being lowered in the well. Lower shear pins 35 temporarily maintain the sleeve 33 in its upper position during installation, but both upper shear pins 32 and lower shear pins 35 are sheared when the flanged shoulder 25 on the body 26 seats on the lower nipple shoulder 23. The upper end of the body 26 is flat and forms a shoulder or stop member, as at 36, for supporting a locking ring 37 loosely mounted around the mandrel or stem 28. The ring 37 is eccentric in that its outside diameter does not have the same axial center as its inside diameter. The inside diameter of the ring 37 is larger than the outside diameter of the mandrel or stem 28 around which it is mounted, whereas the outside diameter is slightly less than the inside diameter of the upper nipple shoulder 22 to permit passage of the ring therethrough. The upper and lower outer peripheries of the ring 37 are beveled, as at 38 and 39 for camming coaction with corresponding beveled surfaces 40 and 41 on the lower and upper peripheries of the upper landing nipple shoulder 22. The lower beveled surface 40 of the nipple shoulder 22 is downwardly facing and engages the upper beveled periphery 38 of the ring 37 when the device is in locked position.

Radial fingers 42 project outwardly from the lower portion of the mandrel 28 and are adapted to loosely contact the upper end of the locking ring 37 to prevent upward movement of the latter. Longitudinal slots 43 are provided in the lower portion of the sleeve 33 forming depending fingers 100 which are adapted to fit between the projecting fingers 42. The slots 43 extend above the fingers 42 when the sleeve 33 is in its raised position. The inner upper periphery of the inside diameter of the locking ring 37 is beveled, as at 44, for coaction with the beveled lower end 45 of the sleeve 33.

OPERATION

Operation of the first described form of the invention comprises the initial step of lowering the described locking mechanism through the well tubing 21. By reason of the bevel surface 46 on the lower shoulder 23 in the landing nipple 20, the body 26 readily passes therethrough until the shoulder 25 thereof rests on the beveled surfaces 46 of the nipple shoulder 23. Continued downward movement of the running tool 30 shears both the upper and lower shear pins 32 and 35 due to the weight of the tool and the parts carried thereby, although jarring may be necessary in some installations to carry out the shearing operation. After the shearing of pins 32 and 35 the downward sliding movement of the sleeve 33 into the eccentric locking ring 37 causes the latter to shift laterally and become engaged in the annular groove 24 between the upper and lower shoulders 22 and 23 in the landing nipple. In this position the downwardly facing shoulder surface 40 on the stop member 22 in the landing nipple 20 prevents upward movement of the locking ring 37; thus, the body 26 is supported and locked in place. Thereafter, the running tool 30 is removed.

To remove the body 26 a conventional pulling or retrieving tool 47 is lowered through the tubing 21 to engage the neck flange 34 on the upper end of the sleeve 33. Upward movement of the retrieving tool 47 first raises the sleeve 33 and removes the lower end thereof from the inside diameter of the locking ring 37, thus releasing the latching connection. Continued upward movement raises the mandrel 28 causing the beveled upper periphery 38 of the ring 37 to contact the downwardly facing bevel surface 40 of the upper nipple shoulder 22 and thereby causes the ring to assume a position whereby it will pass through said upper nipple shoulder 22. Further continued upward movement removes the body 26 from the tubing 21.

MODIFICATIONS

Figure 4:
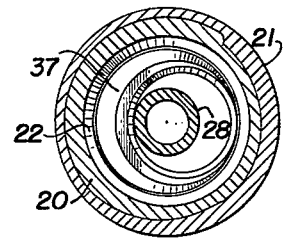
FIGURE 4 is a transverse sectional view taken on lines 4—4 of FIGURE 1.
Figure 6:
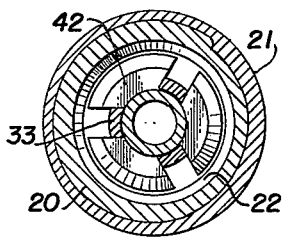
FIGURE 6 is a transverse sectional view taken on lines 6—6 of FIGURE 2.
Figure 5:
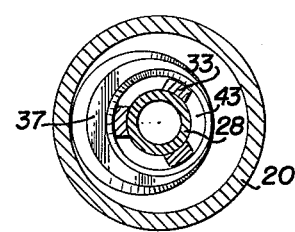
FIGURE 5 is a transverse sectional view taken on lines 5—5 of FIGURE 2.
Figure 1:
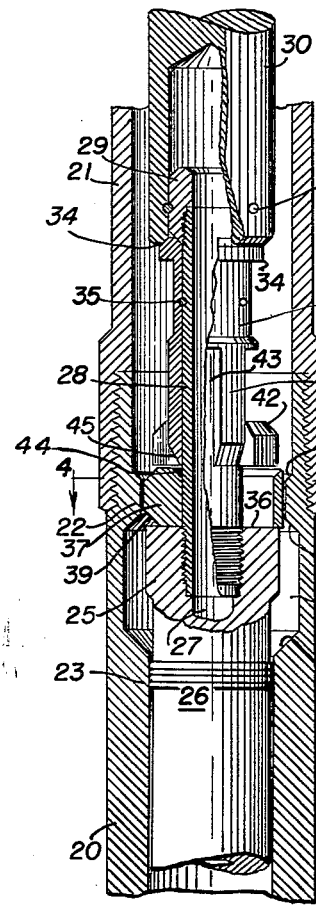
FIGURE 1 is a vertical sectional view of a broken length of tubing having a broken length of landing nipple threadedly secured in the lower end thereof, and showing an exemplary form of the invention positioned therein.
Figure 2:
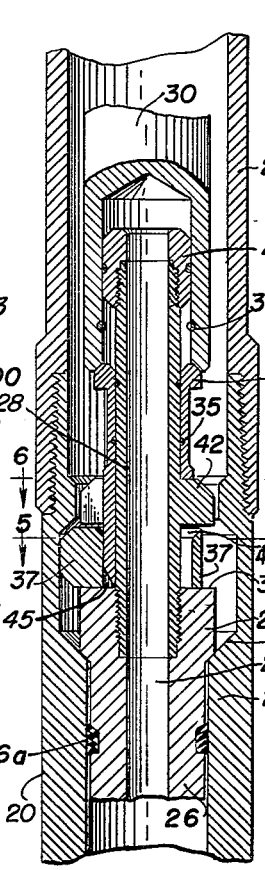
FIGURE 2 is a view similar to FIGURE 1 showing the locking mechanism in its locked position.
Figure 3:
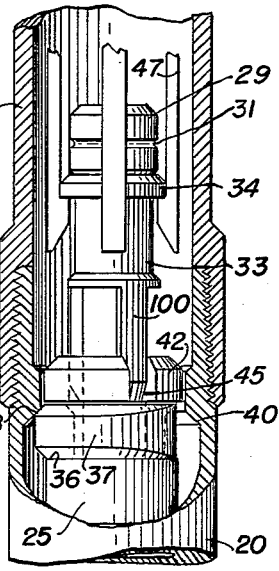
FIGURE 3 is a broken elevation and sectional view similar to FIGURES 1 and 2, and showing the locking mechanism partially removed from the landing nipple.
Figure 8:
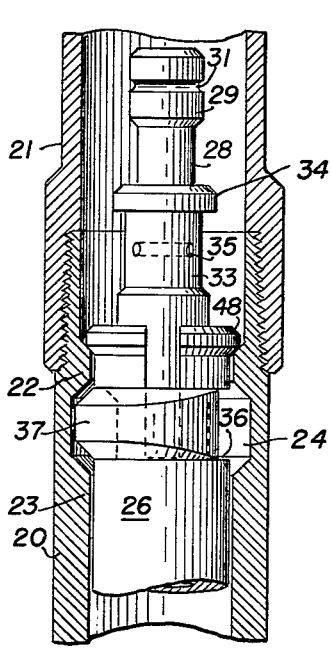
FIGURE 8 is a broken sectional view of a length of tubing and landing nipple and showing a modified form of the invention installed therein.
Figure 9:
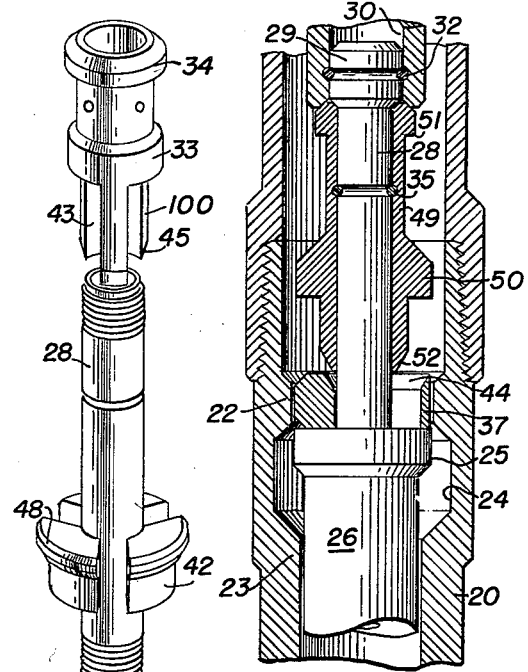
FIGURE 9 is an exploded perspective view of the locking mechanism illustrated in FIGURE 8.

The form of the invention shown in FIGURES 8 and 9 includes the described landing nipple 20, tubing 21, supported housing body 26, eccentric ring 37, mandrel or stem 28, retaining nut 29, and sleeve 33 all as previously described, but differs in that the fingers 42 are provided with lateral projections 48 on the outer upper portions thereof for contacting the upper nipple shoulder 22 which in this case is of the same inside diameter as 23, and thereby eliminates the need for the upper flange 25 on the body 26. The operation of the last described form of the invention is the same as in connection with the first described form of the invention with the exception of the manner of supporting the body 26.

Figure 10:
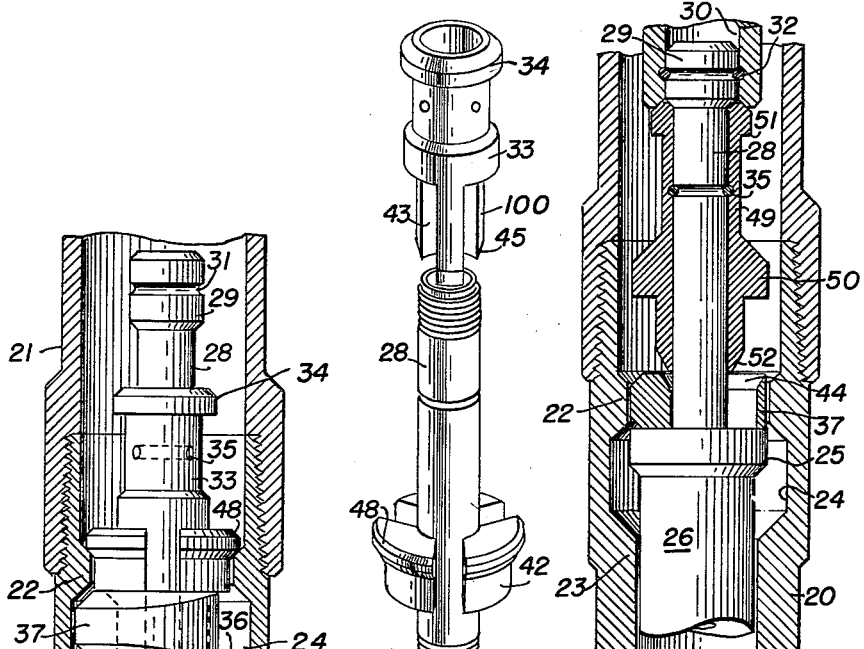
FIGURE 10 is a vertical sectional view of another modified form of the invention showing the locking mechanism partially installed in a landing nipple.
Figure 7:
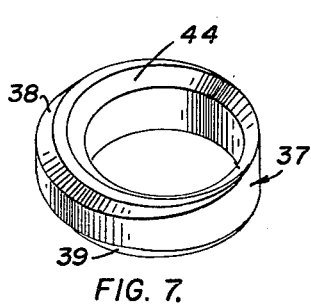
FIGURE 7 is a perspective view of an eccentric locking ring used in preferred embodiments of the invention.
Figure 11:
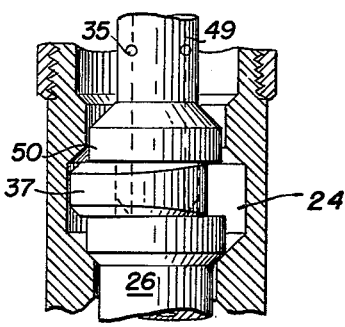
FIGURE 11 is a view similar to FIGURE 10 but showing the mechanism in locked position.
Figure 14:
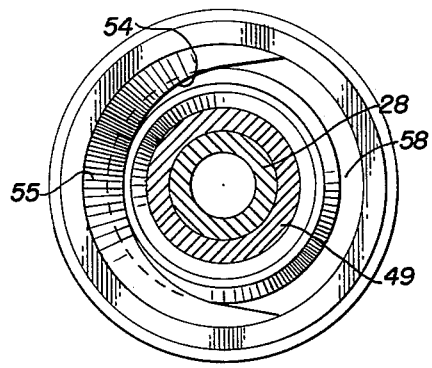
FIGURE 14 is a transverse sectional view of the further modified form of the invention and showing the upper end of the landing nipple and the arcuate locking shoulder forming a part thereof.
Figure 15:
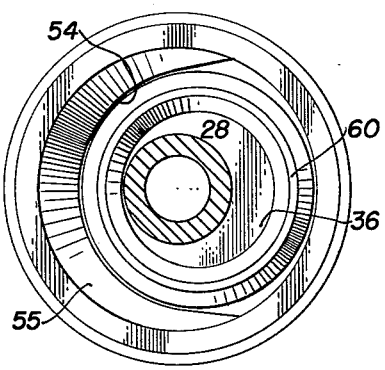
FIGURE 15 is a transverse sectional and plan view similar to FIGURE 14, and showing the relative location of parts as occurs during the removal operation as shown in FIGURE 13.
Figure 16:
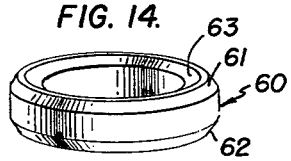
FIGURE 16 is a perspective view of a concentric locking ring used in the modified forms of the invention shown in FIGURES 12 through 15.
Figure 12:
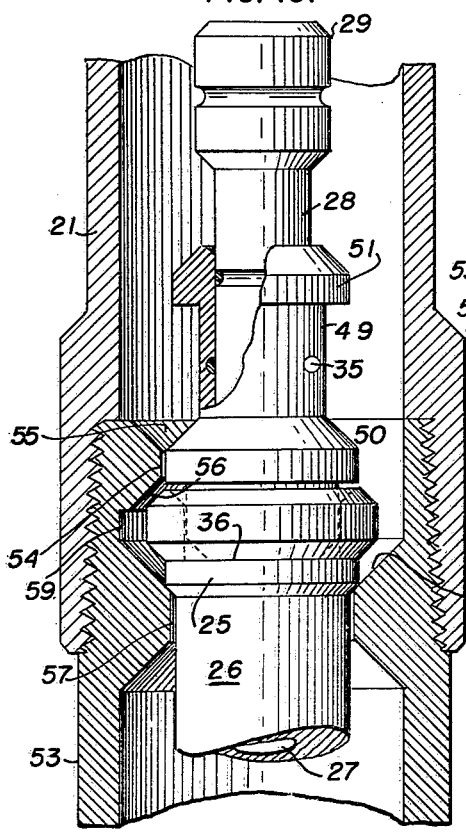
FIGURE 12 is a vertical sectional view of the lower end of a length of well tubing and the upper end of a landing nipple threadedly engaged therein, together with an elevation and broken sectional view of a further modified form of the invention.
Figure 13:
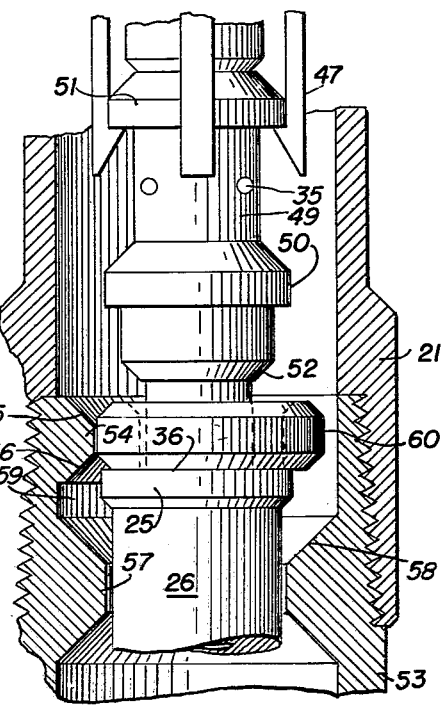
FIGURE 13 is a sectional and elevational view similar to FIGURE 12 and showing the further modified form of the invention being removed from the landing nipple.

The form of the invention shown in FIGURES 10 and 11 is also similar to the first described form of the invention and includes the landing nipple 20, tubing 21, body 26 and flange 25 around the upper end thereof, mandrel or stem 28 secured in the upper end of the body 26 and eccentric ring 37 loosely supported on the upper end or shoulder of said body. This form of the invention differs in the locking or restraining sleeve construction. The latter includes a sleeve 49 having a continuous flange 50 therearound spaced from its lower end. As in the first form of the invention, the sleeve 49 includes a flanged neck 51 around its upper end and a tapered lower end 52 for engaging the beveled inner upper periphery 44 in the ring 37 when the latter is received in the landing nipple groove 24. The operation is as previously described with the exception of the fact that the flange 50 retains the ring 37 against upward movement when the latter is being raised and lowered in the tubing 21.

The form of the invention illustrated in FIGURES 12 through 16 is similar to the form of the invention illustrated in FIGURES 10 and 11, but differs in the landing nipple construction and employs a concentric ring instead of an eccentric ring. The landing nipple 53 is threadedly engaged in a length of tubing 21, which landing nipple includes in its upper end an arcuate internal shoulder 54 having beveled upper and lower faces 55 and 56. There is another internal but annular shoulder 57 below the arcuate shoulder 54, and which annular shoulder is provided with a beveled upper face 58 for guiding the body 26 therethrough and engaging the housing flange 25. There is a space 59 between the shoulders 54 and 57 for receiving one side of a concentric locking ring 60. The ring 60 has upper and lower beveled peripheries 61 and 62 on its outer diameter and a beveled surface 63 on its upper inner periphery. The inside diameter of the ring 60 is substantially greater than the diameter of the mandrel or stem 28 and receives the lower diameter of the sleeve 49 therein.

*Operation (FIGS. 12–16)*

In operation the action of the ring 60, which is loosely mounted on the mandrel or stem 28 and supported on shoulder 36, is lateral of the landing nipple axis when the ring engages or is engaged by the beveled surface 55 of the shoulder 54. After the pins 32 and 35 are sheared, the restraining sleeve 49 moves downwardly by gravity causing the ring to assume a concentric position after the ring has passed below the arcuate shoulder 54 and thereafter the arcuate shoulder prevents upward movement of the ring as long as the sleeve remains within the ring. When removing the body 26 and locking mechanism, a retrieving tool 47 engages the flange 51 on the sleeve 49 and initially withdraws the sleeve 49 from the ring 60 thus releasing the latching mechanism. Continued upward movement displaces the ring 60 laterally by reason of the latter's engagement with the downwardly directed face 56 of the arcuate shoulder 54 in the upper end of the landing nipple 53. Continued upward movement of the retrieving tool raises the housing and locking mechanism to the earth's surface.

The foregoing description corresponds with the disclosures of my earlier applications Serial No. 543,679, filed October 31, 1955, and Serial No. 622,216, filed November 14, 1956. The following description is based on the disclosure of my application Serial No. 431,211, filed May 20, 1954, the principal difference between the respective disclosures being the use of a spring or the like in the disclosure of Serial No. 431,211 to urge the locking ring to move in one longitudinal direction, whereas in the disclosures of Serial Nos. 543,679 and 622,216 the spring is omitted and gravity relied upon to urge the locking ring in a downward direction, although other specific structure differences will also be found to exist in the various specific embodiments.

In all embodiments of the invention herein set forth, a movable body member which may be the housing of the gas lift valve, is adapted (1) to be lowered into a suitable receiver which may be the landing member of suitable well tubing and which is equipped with an inwardly projecting bevel stop or shoulder, (2) to be latched in place in the receiver, and (3) to be withdrawn from the receiver when the latching means is released. The latching means comprises a ring member loosely mounted on a stem, spindle or mandrel of reduced diameter as compared with the diameter of the body member or valve housing, and is adapted to rest upon the top of the body member which serves as a stop against further downward movement of the ring, while permitting free lateral movement. The locking ring and internal shoulder or stop on the tubular receiver are beveled to provide coacting camming means causing the ring to slide laterally sufficiently to permit the ring to pass the stop as the assembly is raised or lowered into or out of the receptacle except where such lateral movement is restrained by other means adapted to be moved into and out of contact with the ring. The ring when so restrained serves as a locking means preventing passage of the ring and parts clamped thereto past the internal stop or shoulder carried by the receiver. The restraining means as herein shown comprises a sleeve slidably mounted on the stem but initially temporarily secured to the stem and having a portion adapted to be moved into and out of engagement with the ring as the sleeve is moved toward or from the locking ring. When the restraining or locking sleeve is in contact with the ring, lateral movement of the ring is prevented and the ring is clamped to the movable body member, but when the sleeve is withdrawn, the ring is released and the body member and parts carried thereby may be withdrawn from the receiver.

The exemplary form of the invention shown in FIGURES 17 through 22 is adapted for operation in a special tubing section 100' having an enlarged laterally offset portion 101, together with a tubular receiver or landing nipple 102 inside of the latter for receiving a gas lift valve 103. As indicated in the foregoing, instead of a gas lift valve, such as 103, a valve blank, a similar shaped choke, or the like, having a body portion adapted to slidably fit in the receiver may be locked in the receiver 102 by means of the invention, and in order to avoid burdening the present description, hereinafter reference will be made to a valve only. The offset portion 101 of the mandrel 100' is provided with inlet ports 104 which are located between the seals 105 on the body of the valve 103 when the latter is in operating position within the receiver 102. Although the invention is not directed to the valve 103 per se, it is pointed out that the receiver 102 is provided with external openings 104 and the lower end of the tubular receiver is provided with opening 106 communicating with the interior of the mandrel 100', and the valve 103 is provided with an inlet 107 between its spaced seals 105. The special tubing section or mandrel 100', or any desired number thereof, are connected between upper and lower ends of oil well tubing lengths 108 as described in connection with U.S. Patent No. 2,664,162, and any suitable valve shifting means may be employed, such as a knuckle joint assembly 109, the lower end of which is detachably connected with the present latch assembly 110 by means of a running tool 111 or a pulling tool 112, depending upon whether or not the valve 103 is being installed or removed. The valve 103 is lowered through the tubing 108 by means of a wire line, not shown, into the special section or mandrel 100' to a depth where the lower pointed end of the valve 103 is just above the upper end of the tubular receiver 102. The knuckle joint 109 and a set of jars 113 may be employed to cause the valve 103 to enter the receiver 102 or the shifting tools of Patents 2,664,162 or 2,679,903 may be employed, if desired.

As shown in detail in FIGURE 21, the present latch assembly 110 is comprised of a rod-like cylindrical member, stem or spindle 115 threadedly secured at its lower end 140 in the upper end of the valve body portion 103. The upper end of the latch stem 115 is provided with a pointed head 116 of larger diameter than said stem, thus providing a shoulder 117 for engagement with a running tool 111 attached to the lower end of the knuckle joint 109. A locking or restraining sleeve 118 is slidably mounted on the latch stem 115, but is temporarily and frangibly secured in its lowermost position against the upper and 143 of the valve 103 by means of a threaded shear pin 119 in an intermediate enlarged portion 120 located between the enlarged ends of said sleeve. As shown, the upper end 141 of the restraining sleeve 118 is shouldered, as at 121, for engagement with a pulling tool 112 attached to the knuckle joint 109 and the lower end of the sleeve 118 is enlarged, as at 122, and a beveled shoulder 123 is provided between the outside diameters of the last referred to enlargement 122 and the portion of the sleeve 118 immediately thereabove.

In accordance with the present embodiment of the invention, a concentric locking ring 124 slidably engages the outer diameter of the lower sleeve enlargement or head portion 122, and such locking ring has an outside diameter greater than the diameter of the valve 103, the top 143 of which provides a stop or shoulder for the locking ring 124 which is slidable laterally relative thereto when the head portion of the restraining sleeve is retracted. The upper and lower surfaces of the ring 124 are beveled, as at 125 and 126 respectively, and are arranged for coaction with a horizontally arcuate locking shoulder or stop 127 integral with the mandrel 100' and positioned above the tubular receiver 102. The arc of the shoulder 127 is substantially a half circle as shown in FIGURE 18. The upper and lower surfaces of the shoulder 127 are beveled for camming coaction with the beveled surfaces 125 and 126 of the ring 124, as indicated at 128 and 129.

*Operation (FIGS. 17–22)*

When running the valve 103 in place, the sleeve 118 is temporarily retained by the shear pin 119 in its described lower position and the ring 124 surrounds the sleeve enlargement 122 and rests upon the top 143 of the flow valve 103, and being held in place by gravity supplemented by a compression spring 130, as shown in FIGURE 21. As the lower beveled end 126 of the locking ring 124 engages the upper beveled end 128 of the locking shoulder 127, the locking ring 124 is moved upwardly relative to the enlarged lower head of the sleeve to the smaller diameter of the sleeve 118 just above the head, whereupon the camming action of the shoulder 127 against the ring moves the latter laterally, as shown in FIGURE 19 to permit the locking ring 124 to pass the shoulder 127. Continued downward movement of the valve 103 brings the locking ring 124 below the locking shoulder 127 (FIG. 20), and the action of gravity aided by the compression spring 130 then urges the ring 124 to its former position around the lower enlarged portion 122 of the sleeve, the ring at the same time moving laterally relative to the stem 115 from the position shown in FIG. 19 to the position shown in FIG. 20 where it locks the assembly within the receiver or nipple 102 as long as the enlargement 122 remains within the ring. Upon subsequently raising the wire line, and consequently the described jars 113, knuckle joint assembly 109 and running tool 111, the locking ring 124 is moved upwardly into engagement with the shoulder 127, which prevents further upward movement of the ring thereby locking the valve assembly as set forth above. Continued upward movement of the wire line disengages the running tool from the latch assembly head 116. Although not shown in the drawings in connection with this particular embodiment, preferably a shear pin type running tool is employed such as illustrated at 30 in FIGURE 1, but it is to be understood that any conventional running tool may be used in connection with the foregoing operation.

In order to retrieve the valve 103, a pulling tool such as 112 (FIG. 22) is lowered by means of the wire line and shifted to engage the shoulder 121 on the upper end of the sleeve 118. The referred to knuckle joint assembly 109 and jars 113 may be employed, or a shifting tool may be used such as described in connection with the referred to Patent No. 2,664,162. The pulling tool 112 engages the shoulder 121 on the sleeve 118, and upward movement of the sleeve by withdrawing the wire line, shears the pin 119 and moves the sleeve upwardly on the latch assembly body 115, thereby withdrawing the enlarged head of the sleeve from the ring 124 which ring remains in contact with the top of the valve 103, and at the same time relieving the pressure of the spring 130 thus permitting the locking ring 124 to shift laterally as shown in FIGURE 22. The beveled upper surface 125 on the ring 124, and its camming contact with the lower beveled surface 129 on the locking shoulder 127 assures the last described lateral action. The continued upward movement of the wire line removes the valve 103 from the well.

*Modification (FIGS. 23–27)*

The form of the invention shown in FIGURES 23 through 27 is similar to the foregoing with the exception of the construction of the locking ring and its coaction with stationary locking shoulder in the mandrel 100'. Accordingly, all parts, other than those last referred to, have the same reference numerals. In the modified form of the invention the locking ring 131 is eccentrically formed; that is, its central opening is asymmetrically formed relative to its outside periphery. Upper and lower beveled portions 132 and 133 are formed on the ring 131 around its thickest portion, and the locking shoulder 135 corresponding in function with shoulder 127 of the previously described embodiment is concentric with the inside diameter of the tubular receiver 102 and forms a complete circle. As shown in FIGURES 23 through 27, the shoulder or stop 135 is spaced below the upper end of the receiver 102 so as to provide a relatively large opening for receiving the lower pointed end of the valve 103. Also, the locking shoulder 135 is beveled at its top and bottom, as at 136 and 137 as is the locking shoulder 127 of the previously described embodiment for coaction with the beveled upper and lower portions 132 and 133 of the eccentric locking ring 131.

*Operation (FIGS. 23–27)*

Figure 23:
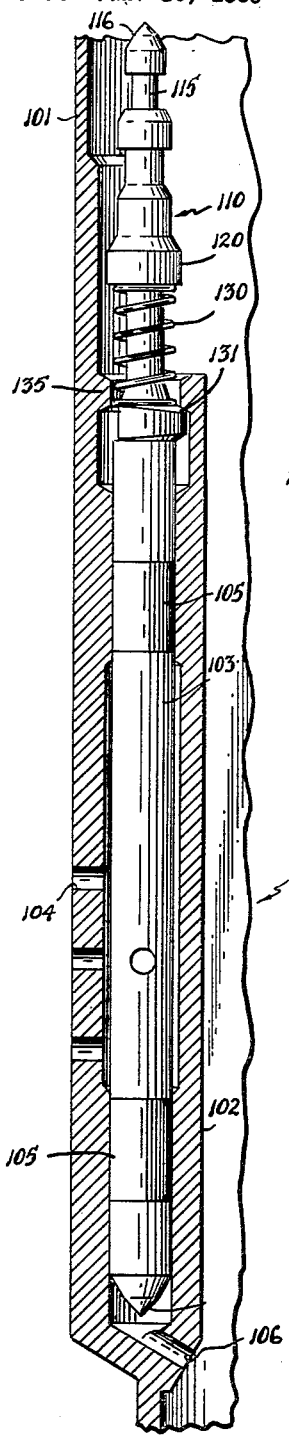
FIGURE 23 is a vertical sectional view of a further modified form of the invention illustrated in FIGURES 17–22, wherein an eccentrically formed locking ring is employed, and a spring is provided to urge the locking ring to move in one direction.
Figure 24:
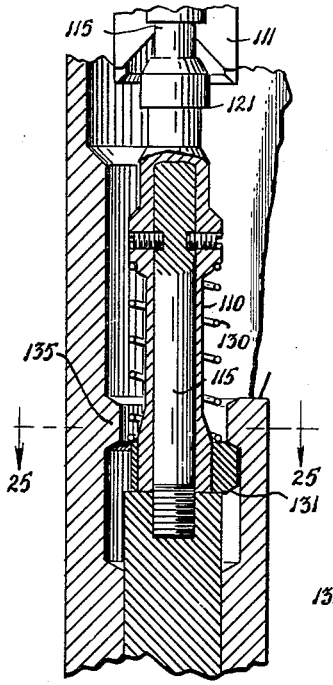
FIGURE 24 is a view similar to FIGURE 20, and showing the modified form of the invention in its locked position, together with the lower end of the running tool connected with the upper end of the latch assembly.
Figure 26:
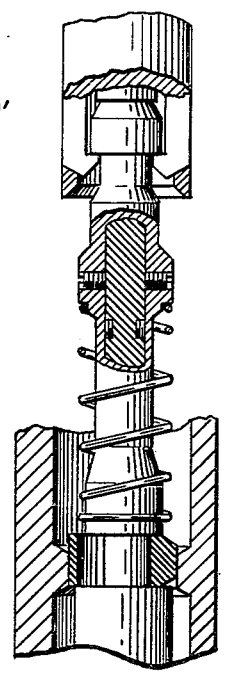
FIGURE 26 is a broken sectional and elevational view similar to FIGURE 24 and showing the present locking mechanism in its position just prior to its engagement with an annular locking shoulder in the tubular portion or receiver of the special tubing section.
Figure 25:
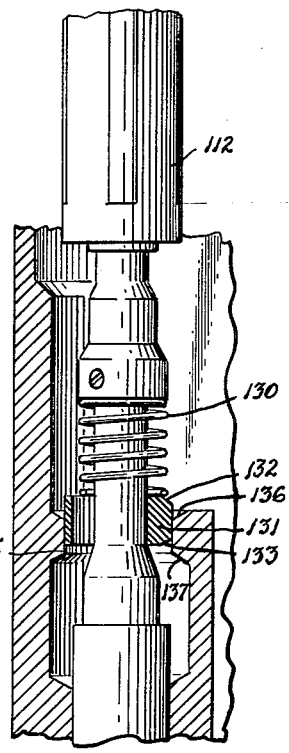
FIGURE 25 is a transverse sectional view taken on line 25—25 of FIGURE 24 and showing the relative position of the locking ring with respect to the locking assembly sleeve when the present mechanism is in its locked position.
Figure 27:
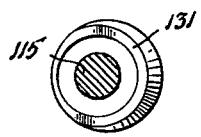
FIGURE 27 is a view similar to FIGURE 26, but showing the valve or the like being drawn from the referred to tubular portion.

As before, the valve 103 is lowered into the receiver 102 by suitable means on the lower end of the wire line and located in operating position as shown in FIGURE 23. As the valve 103 is being lowered in the receiver 102, the projecting thick portion 133 on one side of the locking ring 131 engages a portion of the beveled upper surface 136 of the shoulder 135 and shifts to a position whereby the outside diameter of said ring is concentric with the sleeve 118 and is thus positioned to pass through the round opening of the shoulder 135. After the ring 131 is positioned below the shoulder 135, gravity aided by the action of the spring 130 causes the said ring to assume its position around the enlarged lower end or head 122 of the sleeve 118 which prevents lateral movement of the ring, thereby securely locking the valve assembly below the locking shoulder or stop until the enlarged lower end of the valve 118 is withdrawn, whereupon the valve assembly may be retrieved. Upward movement of the running tool engages the projecting thick portion 134 of the ring with the lower surface of the locking shoulder 135, as shown in FIGURE 24. Thus, the valve 103 is securely locked in position.

To remove the valve 103, a pulling tool such as 112 engages the shoulder 121 on the sleeve 118, and upward movement of said pulling tool shears the pins 119, raises the sleeve and head 122 and allows lateral movement of the locking ring 131. As the upper beveled surface 133 engages the lower beveled surface 137 of the locking shoulder 135, moving the ring laterally and the ring is again positioned to pass through the diameter of said shoulder. As before, withdrawal of the wire line withdraws the valve 103 attached to the pulling tool.

The described latch assembly is not limited to use in offset mandrels, but may be used in other wire line installations for installing and retrieving various mechanisms. Also, the invention is capable of other variations and uses outside the well tubing art as will be apparent to those versed in the art, and which variations may be within the scope of the appended claims.

The invention is not limited to the exemplary constructions herein shown but may be made in various ways within the scope of the appended claims.

I claim:

1. In combination with a flow control device adapted to be lowered into, latched within, and withdrawn from a tubular receiver having an inwardly projecting shoulder or stop, a latching assembly for said flow control device comprising a stem of reduced diameter projecting from said flow control device, a non-expansible latching ring loosely carried by said stem, said stop and said latching ring being provided with coacting camming means, and said latching ring being adapted when unrestrained to freely pass the shoulder of said tubular receiver, reciprocable restraining means movable into and out of engagement with said ring and serving when in engagement with the ring to restrain lateral movement of the ring thereby preventing said ring from passing said shoulder.

2. The combination as set forth in claim 1 wherein the reciprocable restraining means comprises a sleeve slidably mounted on said stem.

3. In combination with tubing or the like having an internally projecting beveled shoulder, a latch assembly adapted to be lowered into, latched within, and raised from the tubing, comprising a body member having a reduced stem portion, a locking sleeve slidably mounted on said stem having an enlarged head portion adapted to be moved into and out of restraining engagement with a locking ring, and latching means comprising a locking ring loosely carried by said sleeve but snugly fitting said enlarged head and adapted to pass said shoulder on movement of the assembly through the tubing in one direction and to subsequently move laterally after passing said shoulder so as to prevent reverse movement of the assembly, said locking ring being beveled to coact with said beveled shoulder to effect lateral movement of the locking ring, means for sliding said sleeve relative to said stem and to move the head into and out of said ring whereby when the head is within the ring, lateral movement of the ring is prevented whereas when the head is removed from the ring, lateral movement of the ring is permitted, and stop means for said ring carried by said body member.

4. For use with a tubular receiver having an internally projecting stop or shoulder, a movable member adapted to be lowered into, latched within and removed from said receiver, said movable member comprising a body portion adapted to fit within the receiver, and a stem portion of reduced diameter, and means for selectively latching or unlatching the movable member comprising a non-expansible ring member loosely mounted on said stem, said stop and said latching ring being provided with coacting camming means, and said latching ring having sufficient lateral play on said stem to permit the same to freely pass the internal stop carried by the receiver and restraining means movable into and out of engagement with said ring to prevent lateral movement when in engagement for restraining the locking ring in the lateral position which prevents the ring from passing the internal shoulder or stop, and means carried by the movable member for restraining longitudinal sliding movement of the ring relative to said member when the ring is restrained from lateral movement, whereby the movable member is prevented from passing said stop while the ring is in latching position.

5. In combination with a tubular receiver having an inwardly projecting shoulder therein, a relatively movable member comprising a stem having an outwardly projecting shoulder thereon, said member being located within the receiver and adapted to be moved longitudinally therethrough, and means for releasably latching the movable member to the tubular receiver to prevent movement in one direction comprising a laterally shiftable latching ring carried by said movable member and laterally movable with reference to said outwardly projecting shoulder, means for preventing further longitudinal movement of the movable member beyond the inwardly projecting shoulder after the ring has passed said shoulder, a sleeve slidably mounted on said movable member for longitudinal movement with reference to said stem and adapted to engage the interior of said ring after the ring has passed the internal shoulder, the outer periphery of said ring being arranged to engage said projecting shoulder in said receiver after passing said shoulder, to prevent withdrawal of the movable member until the sleeve has been withdrawn from the interior of the ring.

6. The combination defined in claim 5, wherein the inside and outside peripheries of said latching ring are concentric.

7. The combination defined in claim 5 including at least one lateral projection extending outwardly from said sleeve and located above said ring.

8. The combination defined in claim 5 wherein said movable member and shoulder thereon include an axial opening therethrough.

9. In combination with a tubular receiver having an inwardly projecting stop member, a relatively movable member adapted to be introduced into said receiver, locked by said stop member and removed from the receiver, said movable member including a stem having an outwardly projecting shoulder and latching means comprising a laterally shiftable locking ring normally loosely mounted on said stem and supported for lateral movement with reference to said shoulder, cam means carried by said stop member and ring respectively to move said ring laterally away from the stop member during insertion or removal of the movable member to permit the ring to pass the stop member, means for preventing further movement of the movable member in one direction after the ring has passed the stop member on said receiver, and means, including a sleeve slidably mounted on the stem having a portion engageable with the interior of the ring, for preventing lateral movement of the ring away from the stop during such engagement, said ring when loosely mounted on the stem being capable of passing the said stop member but being incapable of passing the stop member when prevented from lateral movement by engagement of said sleeve with the receiver thereof whereby the ring is prevented from passing said stop, but permitting lateral movement of the ring when the sleeve portion is disengaged therefrom to permit the ring to pass the stop member.

10. The combination defined in claim 9 and including a retaining nut on the upper end of said stem and a fishing neck around the upper end of said sleeve, means detachably securing said fishing neck with a running tool attached to the lower end of a flexible line, and frangible means securing said sleeve on said stem.

11. The combination defined in claim 9 and wherein said stem includes an opening therethrough.

12. The combination as set forth in claim 9 wherein the movable member comprises a flow valve housing.

13. The combination of a tubular receiver having an inwardly projecting stop member provided at one side thereof, a relatively movable member adapted to be introduced into said receiver for locking engagement with said stop member and subsequently unlocked for withdrawal from the receiver, said movable member including a stem having a shoulder thereon, a continuous locking ring loosely positioned on said stem for lateral shifting movement on said shoulder, said stop member and said locking ring having upper and lower cam edges, the lower and upper cam edges of said ring being engageable respectively with the upper and lower cam edges of said stop member when said movable member is respectively introduced into and withdrawn from said receiver whereby to shift the ring laterally with reference to said shoulder to an eccentric position in the receiver wherein the ring may be lowered and raised past the stop member, the inside and outside peripheries of said ring being concentric, and a sleeve slidable longitudinally on said stem and having its lower portion receivable in and removable upwardly from the inside periphery of said ring, and means for preventing further movement of the mandrel beyond the stop member after the ring has passed said stop member whereby the ring may be shifted laterally to a concentric position in said receiver for locking engagement with the underside of said stop member when said sleeve is slid downwardly into the ring but whereby the ring is permitted to shift to an eccentric position in the receiver by its engagement with the stop member when said sleeve is withdrawn upwardly therefrom.

14. The device as defined in claim 13 wherein the lower end of said sleeve and the top of said ring at the inside periphery thereof are provided with coacting cam edges.

15. In combination with a tubular receiver having an inwardly projecting stop member, a relatively movable member comprising a stem having an outwardly projecting shoulder, said stem including the shoulder being mounted for longitudinal movement relative to the receiver, and said shoulder being of a size to permit the same to pass said stop member, and means for releasably latching the movable member in said receiver to prevent relative longitudinal movement in one direction, said latching means comprising a ring normally loosely mounted on said stem in laterally movable relation to said shoulder, a sleeve mounted on said stem and movable longitudinally relative to the stem into and out of engagement with the interior of the ring, coacting camming means carried by said ring and stop member to cause the ring to move laterally relative to the member to permit the ring to pass the stop member, said sleeve when in engagement with the interior of the ring preventing lateral movement of the ring and thus preventing withdrawal of the movable member past the stop member.

16. The combination of a tubular receiver having an inwardly projecting stop member, a relatively movable member adapted to be introduced into said receiver for locking engagement with said stop member and to be subsequently unlocked for withdrawal from the receiver, said movable member including a stem having a shoulder thereon, a locking ring normally loosely positioned on said stem for shifting movement with reference to said shoulder, said stop member and said locking ring having coacting cam edges, the cam edges of said ring being engageable respectively with the cam edges of said stop member when said movable member is respectively introduced into and withdrawn from said receiver whereby to shift the ring laterally on said shoulder to a position in the receiver wherein the ring may be moved past the stop member, a sleeve slidable longitudinally on said stem and having a portion receivable in and removable from the inside periphery of said ring, and means for preventing further movement of the mandrel beyond the stop member after the ring has passed said stop member, whereby the ring may be shifted laterally to a position in said receiver for locking engagement with said stop member when said sleeve is slid into the ring but whereby the ring is permitted to shift to another position in the receiver by its engagement with the stop member when said sleeve is withdrawn therefrom.

17. In combination with a tubular receiver having an inwardly projecting stop member, a relatively movable member adapted to be introduced into said receiver, locked by said stop member and removed from the receiver, said movable member including a mandrel or stem having an outwardly projecting shoulder and latching means comprising a laterally shiftable locking ring normally loosely mounted on said mandrel and supported for lateral sliding movement on said shoulder, said stop member and ring being provided with coacting cam means to move said ring laterally away from the stop member during insertion or removal of the movable member to permit the ring to pass the stop member, means for preventing further movement of the mandrel in one direction after the ring has passed the stop member on said receiver, and means, including a sleeve slidably mounted on the mandrel having a portion engageable with the interior of the ring for preventing lateral movement of the ring away from the stop during engagement thereof with the sleeve, said ring when loosely mounted on the mandrel being capable of passing the said stop member but being incapable of passing the stop member when prevented from lateral movement by engagement of said sleeve with the receiver thereof whereby the ring is prevented from passing said stop, but permitting lateral movement of the ring when the sleeve portion is disengaged therefrom to permit the ring to pass the stop member, the inside and outside peripheries of the locking ring being eccentric relative to each other and the inwardly projecting stop member in said receiver being circular.

18. The combination of a tubular receiver having an inwardly projecting annular stop member therein, a relatively movable member adapted to be introduced into said receiver for locking engagement with said stop member and subsequently unlocked for withdrawal from the receiver, said movable member including a stem having a shoulder at its lower end, a laterally shiftable locking ring loosely positioned on said stem for lateral shifting movement on said shoulder, said stop member and said locking ring having upper and lower cam edges, the lower and upper cam edges of said ring being engageable respectively with the upper and lower cam edges of the stop member when said movable member is respectively introduced into and withdrawn from said receiver whereby to shift the ring laterally on said shoulder to a concentric position in the receiver wherein the ring may be lowered and raised past the stop member, the inside and outside peripheries of said locking ring being mutually eccentric, and a sleeve slidable longitudinally on said stem and having its lower end portion receivable in and removable upwardly from the inside periphery of said ring, whereby the ring may be shifted laterally to an eccentric position in said receiver for locking engagement with the underside of said stop member when said sleeve is slid downwardly into the ring but whereby the ring is permitted to shift to a concentric position in the receiver by its engagement with the stop member when said sleeve is withdrawn upwardly therefrom, and means for preventing further movement of the movable member beyond the stop member after the ring has passed said stop member.

19. The device as defined in claim 18 wherein the lower end of said sleeve and the top of said ring at the inside periphery thereof are provided with coacting cam edges.

20. The combination of a tubular receiver having an inwardly projecting annular stop member therein, a relatively movable member adapted to be introduced into said receiver for locking engagement with said stop member and subsequently unlocked for withdrawal from the receiver, said movable member including a stem having a shoulder thereon, a continuous locking ring loosely positioned on said stem for lateral shifting movement on said shoulder, said stop member and said locking ring having upper and lower cam edges, the lower and upper cam edges of said ring being engageable respectively with the upper and lower cam edges of the stop member when said movable member is respectively introduced into and withdrawn from said receiver whereby to shift the ring laterally on said shoulder to a concentric position in the receiver wherein the ring may be lowered and raised past the stop member, the inside and outside peripheries of said ring being mutually eccentric, and a sleeve slidable longitudinally on said stem and having its lower portion receivable in and removable upwardly from the inside periphery of said ring, whereby the ring may be shifted laterally to an eccentric position in said receiver for locking engagement with the underside of said stop member when said sleeve is slid downwardly into the ring but whereby the ring is permitted to shift to a concentric position in the receiver by its engagement with the stop member when said sleeve is withdrawn upwardly therefrom, and means for preventing further movement of the movable member beyond the stop member after the ring has passed said stop member.

21. An assembly comprising a flow control device and a latch mechanism adapted to be installed in and removed from a section of well tubing having an inwardly projecting latching shoulder located above a recess for the flow control device, said latch mechanism comprising a cylindrical stem portion of reduced diameter projecting upwardly from the flow control device and having at its upper end an enlarged head for attachment to a running tool, a sleeve slidably mounted on said stem portion having at its lower end an enlarged head of less diameter than the top of the flow control device and having at its other end means for attachment of a pulling tool, frangible means temporarily securing the sleeve to the stem portion with the enlarged lower head in engagement with the top of the flow control device, a locking ring slidable with reference to the sleeve and seatable on the enlarged lower head in engagement with the top of the flow control device, and yielding means urging the locking ring downwardly but permitting the ring to be retracted from the enlarged head when engaged by the inwardly projecting shoulder of said tubing section.

22. In combination with a section of well tubing having a tubular receiver for a flow control device and an internal latching shoulder located above the tubular receiver, a combined flow control device and latching mechanism adapted to be installed in or raised from said section, said latching mechanism comprising a cylindrical rod projecting upwardly from the flow control device, a stop carried by said flow control device adjacent the lower end of said rod, a sleeve slidably mounted on said rod and having an enlarged head at its lower end, frangible means normally holding said sleeve in lowered position with the enlarged head portion engaging said stop, and a locking ring slidable with reference to said sleeve and seatable on said enlarged portion in engagement with said stop, resilient means urging said locking ring against said stop but permitting the ring to be lifted from the enlarged portion on engagement with the internal latching shoulder of said tubing section during seating of the flow control device in the receiver, thereby permitting the ring to pass the latching shoulder and again reseat on the enlarged portion of the sleeve after passing the internal shoulder, thereby latching the flow control device in the receiver, and means on the upper end of said sleeve for engagement by a pulling tool, said sleeve on the pulling operation being inwardly moved upwardly relative to the cylindrical rod by breakage of said frangible means and thus permitting the locking ring to slide laterally beneath the enlarged portion of the sleeve and thus release the assembly from its latched position.

23. In combination with a relatively movable member adapted to be moved axially into, latched within, and withdrawn from a tubular receiver having an internal shoulder above a recess for the movable member, a latching assembly for said movable member comprising a body portion and a stem of reduced diameter projecting from said body portion, a non-expansible laterally and longitudinally shiftable latching ring loosely carried by said stem, said latching ring and shoulder being provided with coacting camming means to move the ring laterally with reference to the stem, and ring-restraining means slidable on said stem and movable into and out of internal engagement with said ring, serving when in engagement with the ring to restrain lateral movement of the ring, thereby preventing said ring from passing said shoulder, said latching ring when unrestrained being adapted to freely pass the shoulder of said tubular receiver.

24. A well tool assembly comprising a movable member and adapted to be installed in and removed from a section of well tubing having an inwardly projecting latching shoulder located above a recess for the movable member, said movable member comprising a body portion having a stem of reduced diameter projecting therefrom and having at its upper end an enlarged head for attachment to a running tool, a sleeve slidably mounted on said stem having at its lower end an enlarged head of less diameter than the top of the body member and having at its other end means for attachment of a pulling tool, means temporarily securing the sleeve to the stem with the enlarged lower head in engagement with the top of the body portion, a locking ring slidable with reference to the sleeve and seatable on the enlarged lower head in engagement with the top of the body portion, and means urging the locking ring downwardly but permitting the ring to be retracted from the enlarged head when engaged by the inwardly projecting shoulder of said tubing section.

25. A well tool assembly as set forth in claim 24, wherein the inner and outer peripheries of the locking ring are concentric.

26. A well tool assembly as set forth in claim 24, wherein the inner and outer peripheries of the locking ring are eccentric.

27. A well tool assembly comprising a movable member adapted to be installed in and removed from a section of well tubing having an inwardly projecting portion located above a recess for the flow control device, said movable member comprising a body portion having a stem of reduced diameter projecting therefrom and having at its upper end an enlarged head for attachment to a running tool, a sleeve slidably positioned on said stem having at its lower end a head portion of less diameter than the top of the body member and having at its other end means for attachment of a pulling tool, means temporarily securing the sleeve to the stem with the lower portion of the sleeve in engagement with the top of the body portion, and a locking ring slidable with reference to the sleeve and seatable on the lower head portion in engagement with the top of the body portion, and means urging the locking ring downwardly but permitting the ring to be retracted from the head when engaged by the inwardly projecting portion of said tubing section.

28. A well tool for use in a well string having an inwardly projecting portion located above a recess for the well tool, said well tool comprising a body portion having a stem of reduced diameter projecting therefrom and having at its upper end an enlarged head for attachment to a running tool, a sleeve slidably mounted on said stem having at its lower end an enlarged head of less diameter than the top of the body portion and having at its other end means for attachment of a pulling tool, means temporarily securing the sleeve to the stem with the enlarged lower head in engagement with the top of the body portion, a locking ring slidable with reference to the sleeve and seatable on the enlarged lower head in engagement with the top of the body portion, and means urging the locking ring downwardly but permitting the ring to be retracted from the enlarged head when engaged by the inwardly projecting portion of said well string.

29. In combination with a section of well tubing having a tubular receiver for a flow control device and an internal latching shoulder portion located above the tubular receiver, a combined flow control device and latching mechanism adapted to be installed in or raised from said section, said latching mechanism comprising a cylindrical rod projecting upwardly from the flow control device, a stop carried by said flow control device adjacent the lower end of said rod, a sleeve slidably mounted on said rod and having an enlarged head at its lower end, means temporarily holding said sleeve in lowered position with the enlarged head portion engaging said stop, and a locking ring slidable with reference to said sleeve and seatable on said enlarged portion in engagement with said stop, means urging said locking ring against said stop but permitting the ring to be lifted from the enlarged portion on engagement with the internal latching shoulder of said tubing section during seating of the flow control device in the receiver, thereby permitting the ring to pass the latching shoulder and again reseat on the enlarged portion of the sleeve after passing the internal shoulder portion, thereby latching the flow control device in the receiver, and means on the upper end of said sleeve for engagement by a pulling tool, said sleeve on the pulling operation being inwardly moved upwardly relative to the cylindrical rod and thus permitting the locking ring to slide laterally beneath the enlarged portion of the sleeve and thus release the assembly from its latched position.

30. In a device of the character described, a relatively movable member adapted to be moved axially into, latched within, and withdrawn from a tubular receiver having an inwardly projecting shoulder portion above a recess for the movable member, said movable member comprising a body portion and a stem of reduced diameter projecting upwardly from said body portion, a laterally and axially shiftable latching ring carried by said movable member, surrounding said stem and slidably seatable on the top of said body portion, said latching ring and shoulder being provided with coacting camming means to move the ring laterally with reference to the stem, and sleeve means slidably positioned on said stem, and having an end portion movable into and out of internal engagement with said ring, frangible means temporarily securing the sleeve in one position relative to the stem, said sleeve means serving when its end portion is in internal engagement with the locking ring to prevent lateral movement of the ring, thereby preventing said ring from passing said shoulder, said latching ring when the end of the sleeve is retracted being adapted to freely pass the shoulder of said tubular receiver.

31. In a device of the character described, a relatively movable member adapted to be lowered into, latched within, and withdrawn from a tubular receiver having an inwardly projecting shoulder portion above a recessed portion for said movable member, a latching assembly for said movable member comprising a body portion and a stem of reduced diameter projecting from the body portion, a latching ring carried by said movable member surrounding said stem and seatable on said body portion and laterally and axially movable with reference thereto and to the stem, coacting camming means carried by said ring and shoulder for moving the ring laterally, restraining means slidably mounted on said stem and having an end portion movable into and out of internal engagement with said ring and serving when in engagement to restrain lateral movement of the ring, thereby preventing the ring from passing said shoulder, said latching ring being of a size to freely pass the shoulder when not restrained.

32. The combination as set forth in claim 31 including means for preventing further movement of the movable member relative to the receiver after having passed said inwardly projecting shoulder.

33. The combination as set forth in claim 31 wherein the inner and outer peripheries of said ring are concentric.

34. In a device of the character described, a relatively movable member adapted to be lowered into, latched within, and withdrawn from a tubular receiver having an inwardly projecting shoulder located above a recess for the movable member, said movable member comprising a body portion and a stem of reduced diameter projecting from the body portion, a latching ring loosely positioned externally of said stem and longitudinally and laterally movable with reference thereto, coacting camming means carried by said ring and shoulder for moving the ring laterally with respect to the stem, restraining means comprising a sleeve slidably mounted on said stem having at its lower end a head portion movable into and out of internal engagement with said ring, means temporarily securing the sleeve to the stem at one end of its movement and serving when in engagement to restrain lateral movement of the ring, thereby preventing the ring from passing said shoulder, said latching ring being of a size to freely pass the shoulder when not restrained.

35. In a device of the character described, a relatively movable member adapted to be moved axially into, latched within, and withdrawn from a tubular receiver having an inwardly projecting portion located above a recess for the movable member, said movable member comprising a body portion and a stem of reduced diameter projecting upwardly from said body portion, a laterally and axially shiftable latching ring carried by said movable member and loosely mounted around said stem and seatable on said body portion, said latching ring and inwardly projecting portion being provided with coacting camming means to move the ring laterally with reference to the stem, and sleeve means slidably positioned on said stem having an end portion of a size fitting within said ring when in lowered position, means temporarily restraining movement of said sleeve relative to the stem, said sleeve when in internal engagement with the locking ring serving to prevent lateral movement of the ring, thereby preventing said ring from passing said inwardly projecting portion, said latching ring when the sleeve is retracted therefrom being adapted to freely pass the inwardly projecting portion of said tubular receiver.

36. In a device of the character described, a relatively movable member adapted to be moved axially into, latched within, and withdrawn from a vertically disposed tubular receiver having an internal shoulder located above a recess for the movable member, a latching assembly for said movable member comprising a body portion and a stem of reduced diameter projecting upwardly from said body portion, a laterally and longitudinally shiftable latching ring loosely carried by said stem and seatable on said body portion, said latching ring and shoulder being provided with coacting camming means to move the ring laterally with reference to the stem, and sleeve means slidably mounted on said stem having one end portion movable into and out of engagement with the top of said body portion, said locking ring being seatable on the end portion of said sleeve, means temporarily restraining movement of said sleeve, said sleeve when its end is in engagement with the ring serving to prevent lateral movement of the ring, thereby preventing said ring from passing said shoulder, said latching ring when the end of the sleeve is retracted therefrom being adapted to freely pass the shoulder of said tubular receiver.

37. In combination with a tubular receiver having an inwardly projecting stop member spaced from its inlet end, a movable member movable axially into and out of said receiver and adapted to be selectively locked beyond said stop member, said movable member comprising a body portion fitting within said tubular receiver and of a size permitting it to pass said stop member and having a stem of reduced diameter projecting from the body portion toward the inlet end of the receiver and forming a shoulder at its juncture with the body portion, and means carried by the movable member for selectively locking and unlocking the movable member beyond the inwardly projecting stop portion to prevent removal of the movable member from the receiver toward the inlet end of the receiver, comprising a locking ring slidably mounted externally of said stem and having an internal diameter substantially greater than the diameter of the stem but less than the diameter of the body member at said shoulder portion, means normally urging said ring toward said shoulder portion, and a locking sleeve mounted for sliding movement on said stem and having an enlarged head portion adapted to snugly fit within the locking ring to prevent lateral movement of the ring relative to the stem, frangible means temporarily securing the sleeve to the stem with its head portion adjacent said shoulder but permitting the sleeve to be retracted from the shoulder on application of sufficient force, said locking ring and said inwardly projecting stop having coacting camming means to effect lateral movement of the ring relative to the stem during entry or removal of said movable member into or out of the tubular member when said ring is not engaged by the head portion of said sleeve, to permit the ring to pass said stop member, said head portion when fitted within the ring preventing lateral movement of the ring and thus preventing withdrawal of the movable member from the receiver after the ring has passed the stop member and until the head is removed from the ring, and means for limiting the movement of the movable member beyond said stop member.

38. In combination with a tubular receiver having an inwardly projecting stop member, a mandrel having an outwardly projecting shoulder, said mandrel including the shoulder being mounted for longitudinal movement relative to the receiver, and said shoulder being of a size to permit the same to pass said stop member, means for releasably latching the mandrel in said receiver to prevent relative longitudinal movement in one direction, said latching means comprising a ring normally loosely mounted on said mandrel in laterally slidable contact with said shoulder, a sleeve mounted on said mandrel and movable longitudinally relative to the mandrel into and out of engagement with the interior of the ring, coacting camming means carried by said ring and stop member to cause the ring to move laterally relative to the stop member to permit the ring to pass the stop member, said sleeve when in engagement with the interior of the ring preventing lateral movement of the ring and thus preventing withdrawal of the mandrel past the stop member, and means for limiting the further downward movement of the mandrel beyond the inwardly projecting stop member after the ring has passed said stop member.

39. In combination with a tubular receiver having an inwardly projecting shoulder therein, a mandrel having an outwardly projecting shoulder thereon, said mandrel being located within the receiver and adapted to be moved longitudinally therethrough, and means for releasably latching the mandrel to the tubular receiver to prevent movement in one direction comprising a laterally shiftable latching ring on said mandrel and in laterally sliding contact with the last said shoulder, coacting camming means carried by said ring and inwardly projecting shoulder to cause the ring to move laterally relative to the shoulder to permit the ring to pass the shoulder, means for preventing further movement of the mandrel beyond the inwardly projecting shoulder after the ring has passed said shoulder, a sleeve slidably mounted for longitudinal movement on said mandrel and adapted to engage the interior of said ring after the ring has passed the internal shoulder, the outer periphery of said ring being arranged to engage said projecting shoulder in said receiver after passing said shoulder, to prevent withdrawal of the mandrel until the sleeve has been withdrawn from the interior of the ring, the inside and outside peripheries of the latching ring being concentric, said sleeve when in engagement with the interior of the ring preventing lateral movement of the ring and thus preventing withdrawal of the mandrel past the shoulder.

40. In combination with a tubular receiver having an inwardly projecting shoulder therein, a mandrel having an outwardly projecting shoulder thereon, said mandrel being located within the receiver and adapted to be moved longitudinally therethrough, and means for releasably latching the mandrel to the tubular receiver to prevent movement in one direction comprising a laterally shiftable latching ring on said mandrel and in laterally sliding contact with the last said shoulder, coacting camming means carried by said ring and inwardly projecting shoulder to cause the ring to move laterally relative to the shoulder to permit the ring to pass the shoulder, means for preventing further movement of the mandrel beyond the inwardly projecting shoulder after the ring has passed said shoulder, a sleeve slidably mounted for longitudinal movement on said mandrel and adapted to engage the interior of said ring after the ring has passed the internal shoulder, the outer periphery of said ring being arranged to engage said projecting shoulder in said receiver after passing said shoulder, to prevent withdrawal of the mandrel until the sleeve has been withdrawn from the interior of the ring, there being at least one lateral projection extending outwardly from said sleeve and located above said ring, said sleeve when in engagement with the interior of the ring preventing lateral movement of the ring and thus preventing withdrawal of the mandrel past the shoulder.

41. In combination with a tubular receiver having an inwardly projecting shoulder therein, a mandrel having an outwardly projecting shoulder thereon, said mandrel being located within the receiver and adapted to be moved longitudinally therethrough, and means for releasably latching the mandrel to the tubular receiver to prevent movement in one direction comprising a laterally shiftable latching ring on said mandrel and in laterally sliding contact with the last said shoulder, coacting camming means carried by said ring and inwardly projecting shoulder to cause the ring to move laterally relative to the shoulder to permit the ring to pass the shoulder, means for preventing further movement of the mandrel beyond the inwardly projecting shoulder after the ring has passed said shoulder, a sleeve slidably mounted for longitudinal movement on said mandrel and adapted to engage the interior of said ring after the ring has passed the internal shoulder, the outer periphery of said ring being arranged to engage said projecting shoulder in said receiver after passing said shoulder, to prevent withdrawal of the mandrel until the sleeve has been withdrawn from the interior of the ring, said mandrel and the shoulder thereon including an axial opening therethrough, said sleeve when in engagement with the interior of the ring preventing lateral movement of the ring and thus preventing withdrawal of the mandrel past the shoulder.

42. The combination of a tubular receiver having an inwardly projecting stop member provided at one side thereof, a relatively movable member adapted to be introduced into said receiver for locking engagement with said stop member and subsequently unlocked for withdrawal from the receiver, said movable member including a stem having a shoulder thereon, a continuous locking ring loosely positioned on said stem for lateral shifting movement on said shoulder, said stop member and said locking ring having upper and lower cam edges, the lower and upper cam edges of said ring being engageable respectively with the upper and lower cam edges of said stop member when said movable member is respectively introduced into and withdrawn from said receiver whereby to shift the ring laterally on said shoulder to an eccentric position in the receiver wherein the ring may be lowered and raised past the stop member, the inside and outside peripheries of said ring being concentric, and a sleeve slidable longitudinally on said stem and having its lower portion receivable in and removable upwardly from the inside periphery of said ring, and means for preventing further movement of the movable member beyond the stop member after the ring has passed said stop member whereby the ring may be shifted laterally to a concentric position in said receiver for locking engagement with the underside of said stop member when said sleeve is slid downwardly into the ring but whereby the ring is permitted to shift to an eccentric position in the receiver by its engagement with the stop member when said sleeve is withdrawn upwardly therefrom.

43. The device as defined in claim 42 wherein the lower end of said sleeve and the top of said ring at the inside periphery thereof are provided with coacting cam edges.

44. The combination of a tubular receiver having an inwardly projecting stop member, a relatively movable member adapted to be introduced into said receiver for locking engagement with said stop member and to be subsequently unlocked for withdrawal from the receiver, said movable member including a stem having a shoulder thereon, a locking ring loosely positioned on said stem for lateral shifting movement on said shoulder, said stop member and said locking ring having cooperating cam edges, the cam edges of said ring being engageable respectively with the cam edges of said stop member when said movable member is respectively introduced into and withdrawn from said receiver whereby to shift the ring laterally on said shoulder to a position in the receiver wherein the ring may be moved past the stop member, a sleeve slidable longitudinally on said stem and having a portion receivable in and removable from the inside periphery of said ring, and means for preventing further movement of the movable member beyond the stop member after the ring has passed said stop member, whereby the ring may be shifted laterally to a position in said receiver for locking engagement with said stop member when said sleeve is slid into the ring but whereby the ring is permitted to shift to another position in the receiver by its engagement with the stop member when said sleeve is withdrawn therefrom.

45. In combination with a tubular receiver having an inwardly projecting shoulder therein, a stem having an outwardly projecting shoulder thereon, said stem being located within the receiver and adapted to be moved longitudinally therethrough, and means for releasably latching the stem to the tubular receiver to prevent movement in one direction comprising a laterally shiftable latching ring loosely positioned on said stem and in laterally sliding contact with said outwardly projecting shoulder, coacting camming means carried by said ring and inwardly projecting shoulder respectively to cause said ring to move laterally relative to the inwardly projecting shoulder to permit the ring to pass said inwardly projecting shoulder, means for preventing further movement of the stem beyond the inwardly projecting shoulder after the ring has passed said shoulder, a sleeve slidably mounted for longitudinal movement on said stem and adapted to engage the interior of said ring after the ring has passed the inwardly projecting shoulder, the outer periphery of said ring being arranged to engage said projecting shoulder in said receiver after passing said shoulder, to prevent withdrawal of the stem until the sleeve has been withdrawn from the interior of the ring.

46. In combination with a tubular receiver having an inwardly projecting stop member, a relatively movable member adapted to be introduced into said receiver, locked by said stop member and removed from the receiver, said movable member including a stem having an outwardly projecting shoulder and latching means comprising a laterally shiftable locking ring normally loosely mounted on said stem and supported for lateral sliding movement on said shoulder, cam means carried by said stop member and ring respectively to move said ring laterally away from the stop member during insertion or removal of the movable member to permit the ring to pass the stop member, means for preventing further movement of the stem in one direction after the ring has passed the stop member on said receiver, and means, including a sleeve slidably mounted on the stem having a portion engageable with the interior of the ring, for preventing lateral movement of the ring away from the stop during such engagement, said ring when loosely mounted on the stem being capable of passing the said stop member but being incapable of passing the stop member when prevented from lateral movement by engagement of said sleeve with the receiver thereof whereby the ring is prevented from passing said stop, but permitting lateral movement of the ring when the sleeve portion is disengaged therefrom to permit the ring to pass the stop member.

47. In combination with a tubular receiver having an inwardly projecting stop member, a relatively movable member adapted to be introduced into said receiver, locked by said stop member and removed from the receiver, said movable member including a stem having an outwardly projecting shoulder and latching means comprising a laterally shiftable locking ring mounted on said stem, said ring being of greater internal diameter than the diameter of the stem, but of less internal diameter than the diameter of the shoulder, cam means carried by said stop member and ring respectively to move said ring laterally away from the stop member during insertion or removal of the movable member to permit the ring to pass the stop member, means for preventing further movement of the stem in one direction after the ring has passed the stop member on said receiver, and means including a sleeve slidably mounted on the stem having a portion engageable with the interior of the ring for preventing lateral movement of the ring away from the stop during such engagement, said ring when loosely mounted on the stem being capable of passing the said stop member but being incapable of passing the stop member when prevented from lateral movement by engagement of said sleeve with the receiver thereof whereby the ring is prevented from passing said stop, but permitting lateral movement of the ring when the sleeve portion is disengaged therefrom to permit the ring to pass the stop member.

No references cited.